(12) United States Patent
Smith

(10) Patent No.: US 12,295,529 B2
(45) Date of Patent: May 13, 2025

(54) FOOD DELIVERY ASSEMBLY

(71) Applicant: Joey Smith, Philadelphia, PA (US)

(72) Inventor: Joey Smith, Philadelphia, PA (US)

(*) Notice: Subject to any disclaimer, the term of this patent is extended or adjusted under 35 U.S.C. 154(b) by 377 days.

(21) Appl. No.: 17/853,844

(22) Filed: Jun. 29, 2022

(65) Prior Publication Data

US 2024/0000271 A1    Jan. 4, 2024

(51) Int. Cl.
*A47J 47/14* (2006.01)
*B65D 81/38* (2006.01)
*G06Q 10/08* (2024.01)
*G06Q 10/083* (2023.01)
*G07C 9/00* (2020.01)

(52) U.S. Cl.
CPC .......... *A47J 47/14* (2013.01); *B65D 81/3813* (2013.01); *G06Q 10/083* (2013.01); *G07C 9/00309* (2013.01); *G07C 2009/00388* (2013.01); *G07C 2009/00396* (2013.01)

(58) Field of Classification Search
CPC .............. G06Q 10/083; G07C 9/00896; G07C 9/00309; G07C 2009/00388; G07C 2009/0092; G07C 2009/00769; G07C 2009/00396; A47J 47/14; B65D 81/3813
See application file for complete search history.

(56) References Cited

U.S. PATENT DOCUMENTS

| | | | |
|---|---|---|---|
| 8,138,886 B1 * | 3/2012 | Chang ................ | G07C 9/00309 340/5.32 |
| D677,156 S | 3/2013 | Wu | |
| 11,361,603 B1 * | 6/2022 | Ismail .................... | A47J 47/14 |
| 2005/0263411 A1 | 12/2005 | Harrington | |
| 2012/0031921 A1 | 2/2012 | Cadiente | |
| 2012/0298673 A1 | 11/2012 | Chen | |
| 2017/0127868 A1 | 5/2017 | Adewuyi | |
| 2018/0130017 A1 * | 5/2018 | Gupte ................ | G06Q 10/0836 |
| 2019/0130348 A1 * | 5/2019 | Mellado ............ | G06Q 10/0832 |
| 2020/0331675 A1 | 10/2020 | Jones | |
| 2020/0359819 A1 * | 11/2020 | Roberts .................... | E05B 65/06 |
| 2021/0228011 A1 | 7/2021 | Foster | |
| 2022/0079366 A1 * | 3/2022 | Cotton-Betteridge ...................... | G06Q 10/0832 |
| 2022/0114850 A1 * | 4/2022 | Foster ................ | G07C 9/00896 |
| 2022/0408973 A1 * | 12/2022 | Pierre ................... | A47J 41/005 |

FOREIGN PATENT DOCUMENTS

WO    WO2021151032    7/2021

* cited by examiner

*Primary Examiner* — Yong Hang Jiang

(57) ABSTRACT

A food delivery assembly includes a box that is comprised of a thermally insulating material thereby facilitating the box to inhibit heated items from cooling when the heated items are placed in the box. A lid is movably coupled to the box for opening and closing the box and to inhibit the heated items from cooling when the heated items are placed in the box. An engagement is coupled to the lid and a locking unit is attached to the box. The locking unit releasably engages the engagement when the lid is close. The locking unit is in wireless communication with a personal electronic device possessed by a recipient of the food delivery. The locking unit is actuated into a disengaging condition when a pin is communicated from the personal electronic device to the locking unit to access the hot food item.

6 Claims, 3 Drawing Sheets

FOOD DELIVERY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to delivery devices and more particularly pertains to a new delivery device for keeping food secure during a food delivery. The device includes a thermally insulated box and a thermally insulated lid for storing a hot food item. The device includes a locking unit that locks the lid to secure the hot food item. The locking unit is in wireless communication with the recipient's personal electronic device. The locking unit is unlocked when a pin is entered into the personal electronic device to facilitate the recipient to remove the hot food item from the box.

(2) Description of Related Art Including Information Disclosed Under 37 CFR 1.97 and 1.98

The prior art relates to delivery devices including a food container device that has a plurality of chambers, a lid and a lock for storing unfinished food. The prior art discloses a food storage plate that includes a hinged lid with a pair of teeth that each releasably engage a pair of wells for closing the hinged lid. The prior art discloses a left-over food container that includes a tray, a lid that is removably attachable to the tray and a series of notches in the lid that each engage the tray. The prior art discloses a delivery box that includes a zippered door for accessing an interior of the delivery box. The prior art discloses a food security device that includes a bag clip that is in wireless communication with a cell phone. The prior art discloses an insulated food delivery box that includes a digital lock with a numerical key pad.

BRIEF SUMMARY OF THE INVENTION

An embodiment of the disclosure meets the needs presented above by generally comprising a box that is comprised of a thermally insulating material thereby facilitating the box to inhibit heated items from cooling when the heated items are placed in the box. A lid is movably coupled to the box for opening and closing the box and to inhibit the heated items from cooling when the heated items are placed in the box. An engagement is coupled to the lid and a locking unit is attached to the box. The locking unit releasably engages the engagement when the lid is close. The locking unit is in wireless communication with a personal electronic device possessed by a recipient of the food delivery. The locking unit is actuated into a disengaging condition when a pin is communicated from the personal electronic device to the locking unit to access the hot food item.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
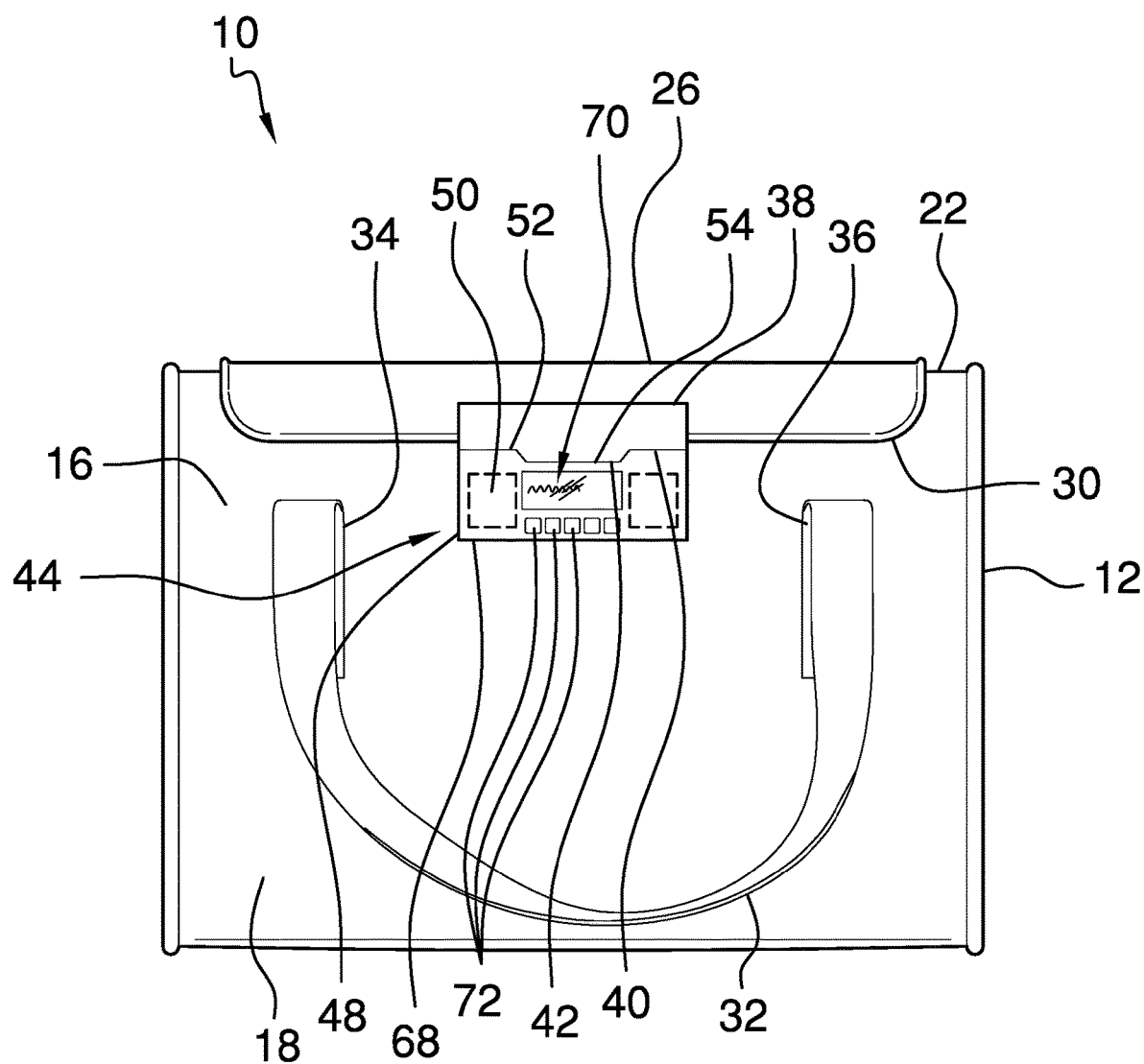
FIG. 1 is a front phantom view of a food delivery assembly according to an embodiment of the disclosure.
Figure 2:
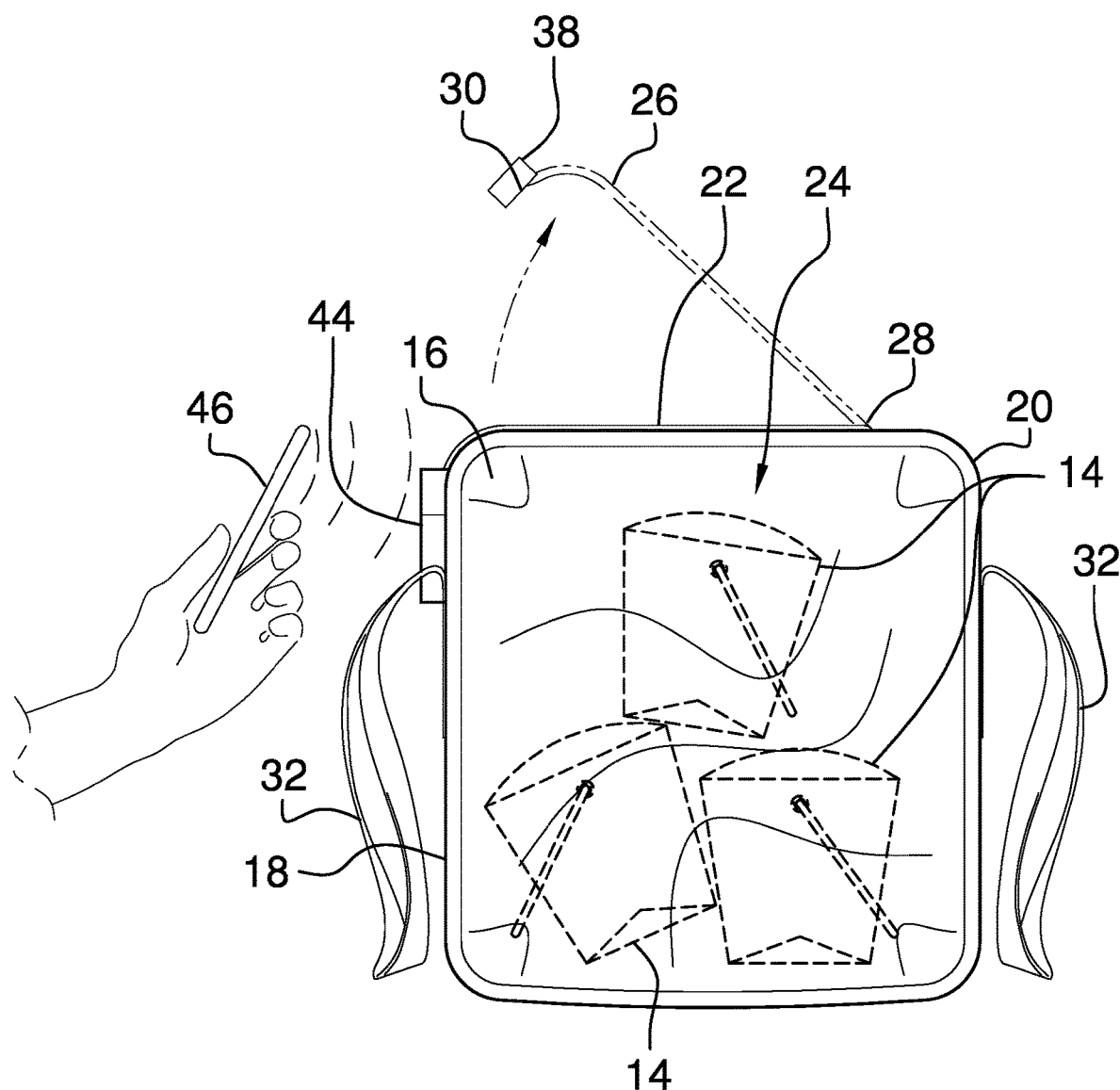
FIG. 2 is a left side phantom view of an embodiment of the disclosure.
Figure 3:
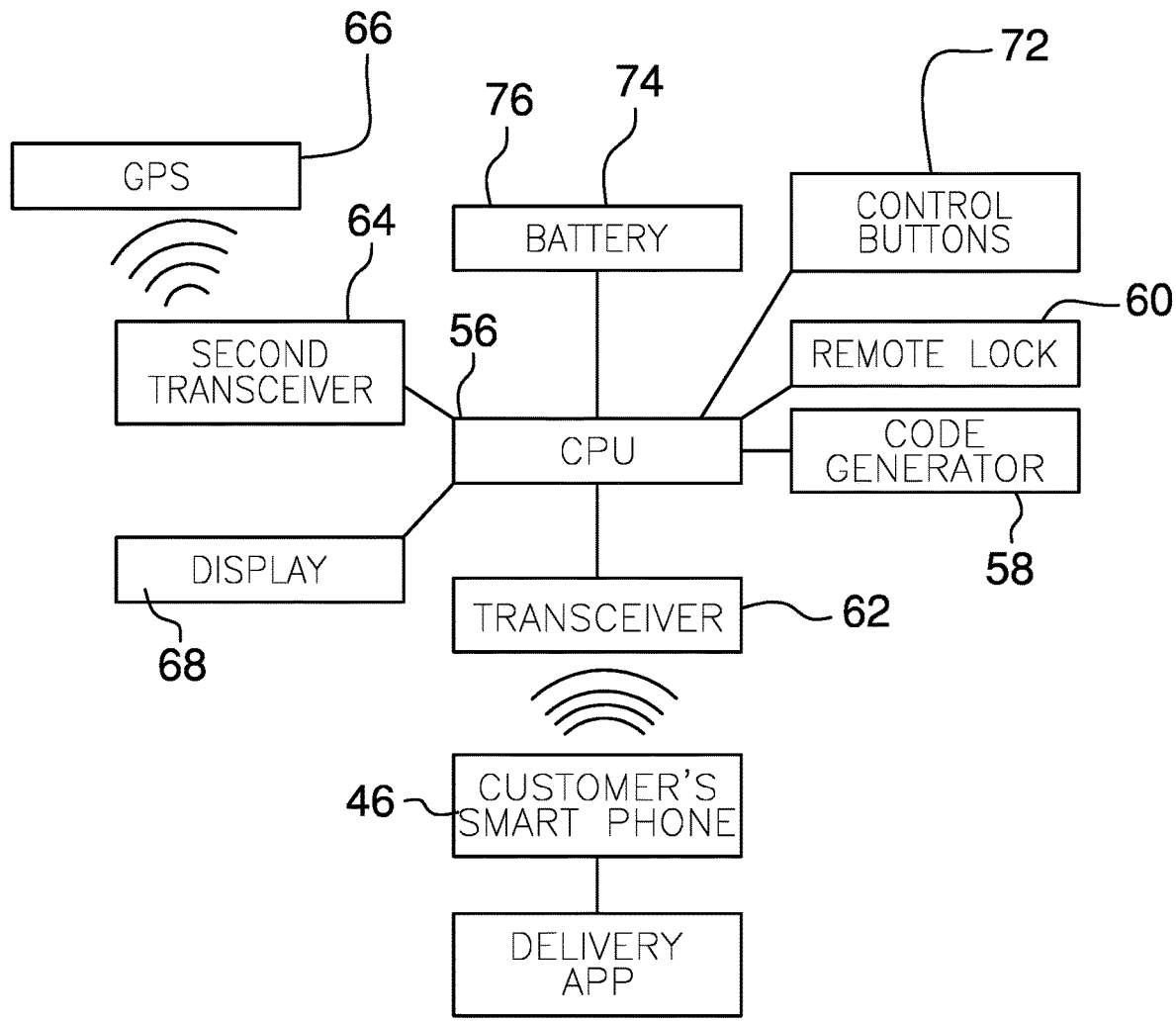
FIG. 3 is a schematic view of an embodiment of the disclosure.

With reference now to the drawings, and in particular to FIGS. 1 through 3 thereof, a new delivery device embodying the principles and concepts of an embodiment of the disclosure and generally designated by the reference numeral 10 will be described.

As best illustrated in FIGS. 1 through 3, the food delivery assembly 10 generally comprises a box 12 that is comprised of a thermally insulating material thereby facilitating the box 12 to inhibit heated items from cooling when the heated items are placed in the box 12. In this way the box 12 can carry hot food 14 for a food delivery. The box 12 has an outer wall 16 and the outer wall 16 has a front side 18, a back side 20 and a top edge 22 defining an opening 24 into the box 12. A lid 26 is movably coupled to the box 12 for opening and closing the box 12 and the lid 26 is comprised of a thermally insulating material thereby facilitating the lid 26 to inhibit the heated items from cooling when the heated items are placed in the box 12. The lid 26 has a rear edge 28 and a front edge 30, and the lid 26 is curved adjacent to the front edge 30. The rear edge 28 is hingedly coupled to the top edge 22 of the box 12 corresponding to the back side 20 of the outer wall 16 of the box 12 and the front edge 30 is directed downwardly along the front side 18 of the outer wall 16 when the lid 26 is closed.

A pair of straps 32 is provided and each of the straps 32 is coupled to the box 12 thereby facilitating each of the straps 32 to be gripped for carrying the box 12. Each of the straps 32 has a first end 34 and a second end 36; the first end 34 and the second end 36 of each of the straps 32 is coupled to a respective one of the front side 18 and the back side 20 of the outer wall 16 of the box 12 such that each of the straps 32 forms a loop. An engagement 38 is coupled to the lid 26, the engagement 38 extends downwardly from the front edge 30 of the lid 26 and the engagement 38 is centrally positioned along the front edge 30. The engagement 38 has a lower edge 40 and the engagement 38 has a prominence 42 that is centrally positioned along the lower edge 40.

A locking unit 44 is attached to the box 12 and the locking unit 44 releasably engages the engagement 38 when the lid 26 is closed. In this way the locking unit 44 can secure the hot food 14 item in the box 12 during the food delivery. The locking unit 44 is in wireless communication with a personal electronic device 46 that is possessed by a recipient of the food delivery and the locking unit 44 broadcasts a pin to the personal electronic device 46. Moreover, the locking unit 44 is actuated into a disengaging condition when the pin is communicated from the personal electronic device 46 to the locking unit 44. In this way the locking unit 44 facilitates the recipient to unlock the lid 26 to access the hot food 14 item. The personal electronic device 46 may comprise a smart phone or the like and the personal electronic device 46 stores an operational program such as a smart phone app or the like for entering the pin into the locking unit 44.

The locking unit 44 comprises a housing 48 that is attached to the front side 18 of the outer wall 16 of the box 12. The housing 48 has a front wall 50 and a top wall 52, and the top wall 52 has a depression 54 that is centrally positioned along the top wall 52. The engagement 38 on the lid 26 abuts the top wall 52 having the depression 54 receiving the prominence 42 when the lid 26 is closed. The locking unit 44 includes a control circuit 56 that is positioned in the housing 48. The control circuit 56 receives a lock input and the control circuit 56 receives an unlock input. Additionally, the control circuit 56 includes a code generator 58 and the code generator 58 generates a random sequence of digits when the control circuit 56 receives the lock input.

The locking unit 44 includes a lock 60 is integrated into the housing 48 and the lock 60 is electrically coupled to the control circuit 56. The lock 60 is actuated into a locking condition when the control circuit 56 receives the lock input. The lock 60 is actuated into an unlocking condition when the control circuit 56 receives the unlock input. Additionally, the control circuit 56 receives the lock input when lock 60 senses that the engagement 38 abuts the housing 48. The engagement 38 may be comprised of a ferromagnetic material and the lock 60 may comprise an electromagnet.

The locking unit 44 includes a first transceiver 62 that is positioned in the housing 48. The first transceiver 62 is electrically coupled to the control circuit 56 and the first transceiver 62 is in wireless communication with the personal electronic device 46. The first transceiver 62 receives the random sequence of digits from the code generator 58 when the control circuit 56 receives the lock input. Additionally, the first transceiver 62 broadcasts the random sequence of digits to the personal electronic device 46 when the control circuit 56 receives the lock input. Conversely, the first transceiver 62 receives the random sequence of digits from the personal electronic device 46 when the recipient enters the random sequence of digits into the personal electronic device 46. The control circuit 56 receives the unlock input when the first transceiver 62 receives the random sequence of digits from the personal electronic device 46. The first transceiver 62 may comprise a radio frequency transceiver or the like and the first transceiver 62 may employ Bluetooth communication protocols.

The locking unit 44 includes a second transceiver 64 that is positioned in the housing 48 and the second transceiver 64 is electrically coupled to the control circuit 56. The second transceiver 64 is in wireless communication with a global positioning system 66 thereby facilitating the second transceiver 64 to communicate the physical location of the box 12 to the first transceiver 62. The first transceiver 62 broadcasts the physical location of the box 12 to the personal electronic device 46 thereby facilitating the recipient of the food delivery to track the food delivery. The second transceiver 64 may comprise a radio frequency transceiver or the like.

The locking unit 44 includes a display 68 that is integrated into the front wall 50 of the housing 48 and the display 68 is electrically coupled to the control circuit 56. The display 68 displays indicia 70 comprising words and numbers for visually communicating the random sequence of digits. The locking unit 44 includes a plurality of control buttons 72 and each of the control buttons 72 is movably integrated into the front wall 50 of the housing 48. Each of the control buttons 72 is electrically coupled to the control circuit 56 and each of the control buttons 72 controls various operational parameters of the control circuit 56, including but not being limited to, the phone number of the recipient of the food delivery. A power supply 74 is positioned in the housing 48, the power supply 74 is electrically coupled to the control circuit 56 and the power supply 74 comprises at least one battery 76.

In use, the hot food 14 item is placed in the box 12 and the lid 26 is closed when the box 12 is located at a restaurant or other type of business that sells and delivers prepared food. The locking unit 44 broadcasts the pin to the personal electronic device 46 when the phone number of the recipient is entered with the control buttons 72. Furthermore, the lid 26 is locked closed once the locking unit 44 broadcasts the pin to the personal electronic device 46. In this way a delivery person, for example, is inhibited from accessing the hot food 14 item during the food delivery. The recipient enters the pin into the personal electronic device 46 when the food delivery is delivered thereby facilitating the locking unit 44 to unlock the lid 26. In this way the recipient can remove the hot food 14 item from the box 12 when the hot food 14 item has been delivered.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A food delivery assembly for securing food items during a food delivery, said assembly comprising:
 a box being comprised of a thermally insulating material thereby facilitating said box to inhibit heated items from cooling when the heated items are placed in said box wherein said box is configured to carry hot food for a food delivery;
 a lid being movably coupled to said box for opening and closing said box, said lid being comprised of a thermally insulating material thereby facilitating said lid to inhibit the heated items from cooling when the heated items are placed in said box;
 a pair of straps, each of said straps being coupled to said box thereby facilitating each of said straps to be gripped for carrying said box;
 an engagement being coupled to said lid; and
 a locking unit being attached to said box, said locking unit releasably engaging said engagement when said lid is closed wherein said locking unit is configured to secure the hot food item in said box during the food delivery, said locking unit being in wireless communication with a personal electronic device being possessed by a recipient of the food delivery, said locking unit broadcasting a pin to the personal electronic device, said locking unit being actuated into a disengaging condition when the pin is communicated from the personal electronic device to said locking unit wherein said locking unit is configured to facilitate the recipient to unlock said lid to access the hot food item, said locking unit broadcasting the pin to the personal electronic device when a phone number of the recipient is entered with a plurality of control buttons.

2. The assembly according to claim 1, wherein:
 said box has an outer wall, said outer wall having a front side, a back side and a top edge defining an opening into said box;
 said lid has a rear edge and a front edge, said lid being curved adjacent to said front edge, said rear edge being hingedly coupled to said top edge of said box corresponding to said back side of said outer wall of said box, said front edge being directed downwardly along said front side of said outer wall when said lid is closed;
 each of said straps has a first end and a second end, said first end and said second end of each of said straps being coupled to a respective one of said front side and said back side of said outer wall of said box such that each of said straps forms a loop; and
 said engagement extends downwardly from said front edge of said lid, said engagement being centrally positioned along said front edge, said engagement having a lower edge, said engagement having a prominence being centrally positioned along said lower edge.

3. The assembly according to claim 2, wherein said locking unit comprises:
 a housing being attached to said front side of said outer wall of said box, said housing having a front wall and a top wall, said top wall having a depression being centrally positioned along said top wall, said engagement on said lid abutting said top wall having said depression receiving said prominence when said lid is closed;
 a control circuit being positioned in said housing, said control circuit receiving a lock input, said control circuit receiving an unlock input, said control circuit including a code generator, said code generator generating a random sequence of digits when said control circuit receives said lock input; and
 a lock being integrated into said housing, said lock being electrically coupled to said control circuit, said lock being actuated into a locking condition when said control circuit receives said lock input, said lock being actuated into an unlocking condition when said control circuit receives said unlock input, said control circuit receiving said lock input when lock senses that said engagement abuts said housing.

4. The assembly according to claim 3, wherein:
 said locking unit includes a first transceiver being positioned in said housing, said first transceiver being electrically coupled to said control circuit, said first transceiver being in wireless communication with the personal electronic device, said first transceiver receiving said random sequence of digits from said code generator when said control circuit receives said lock input, said first transceiver broadcasting said random sequence of digits to the personal electronic device when said control circuit receives said lock input;
 said first transceiver receives said random sequence of digits from the personal electronic device when the recipient enters said random sequence of digits into the personal electronic device, said control circuit receiving said unlock input when said first transceiver receives said random sequence of digits from the personal electronic device; and
 said locking unit includes a second transceiver being positioned in said housing, said second transceiver being electrically coupled to said control circuit, said second transceiver being in wireless communication with a global positioning system thereby facilitating said second transceiver to communicate the physical location of said box to said first transceiver, said first transceiver broadcasting the physical location of said box to the personal electronic device wherein said first transceiver is configured to facilitate the recipient of the food delivery to track the food delivery.

5. The assembly according to claim 3, wherein said locking unit includes:
 a display being integrated into said front wall of said housing, said display being electrically coupled to said control circuit, said display displaying indicia comprising words and numbers for visually communicating said random sequence of digits;
 each of said control buttons being movably integrated into said front wall of said housing, each of said control buttons being electrically coupled to said control circuit, each of said control buttons controlling various operational parameters of said control circuit; and
 a power supply being positioned in said housing, said power supply being electrically coupled to said control circuit, said power supply comprising at least one battery.

6. A food delivery assembly for securing food items during a food delivery, said assembly comprising:
 a box being comprised of a thermally insulating material thereby facilitating said box to inhibit heated items from cooling when the heated items are placed in said box wherein said box is configured to carry hot food for a food delivery, said box having an outer wall, said outer wall having a front side, a back side and a top edge defining an opening into said box;
 a lid being movably coupled to said box for opening and closing said box, said lid being comprised of a thermally insulating material thereby facilitating said lid to inhibit the heated items from cooling when the heated items are placed in said box, said lid having a rear edge and a front edge, said lid being curved adjacent to said front edge, said rear edge being hingedly coupled to said top edge of said box corresponding to said back side of said outer wall of said box, said front edge being directed downwardly along said front side of said outer wall when said lid is closed;

a pair of straps, each of said straps being coupled to said box thereby facilitating each of said straps to be gripped for carrying said box, each of said straps having a first end and a second end, said first end and said second end of each of said straps being coupled to a respective one of said front side and said back side of said outer wall of said box such that each of said straps forms a loop;

an engagement being coupled to said lid, said engagement extending downwardly from said front edge of said lid, said engagement being centrally positioned along said front edge, said engagement having a lower edge, said engagement having a prominence being centrally positioned along said lower edge; and a locking unit being attached to said box, said locking unit releasably engaging said engagement when said lid is closed wherein said locking unit is configured to secure the hot food item in said box during the food delivery, said locking unit being in wireless communication with a personal electronic device being possessed by a recipient of the food delivery, said locking unit broadcasting a pin to the personal electronic device, said locking unit being actuated into a disengaging condition when the pin is communicated from the personal electronic device to said locking unit wherein said locking unit is configured to facilitate the recipient to unlock said lid to access the hot food item, said locking unit comprising:

a housing being attached to said front side of said outer wall of said box, said housing having a front wall and a top wall, said top wall having a depression being centrally positioned along said top wall, said engagement on said lid abutting said top wall having said depression receiving said prominence when said lid is closed;

a control circuit being positioned in said housing, said control circuit receiving a lock input, said control circuit receiving an unlock input, said control circuit including a code generator, said code generator generating a random sequence of digits when said control circuit receives said lock input;

a lock being integrated into said housing, said lock being electrically coupled to said control circuit, said lock being actuated into a locking condition when said control circuit receives said lock input, said lock being actuated into an unlocking condition when said control circuit receives said unlock input, said control circuit receiving said lock input when lock senses that said engagement abuts said housing;

a first transceiver being positioned in said housing, said first transceiver being electrically coupled to said control circuit, said first transceiver being in wireless communication with the personal electronic device, said first transceiver receiving said random sequence of digits from said code generator when said control circuit receives said lock input, said first transceiver broadcasting said random sequence of digits to the personal electronic device when said control circuit receives said lock input, said first transceiver receiving said random sequence of digits from the personal electronic device when the recipient enters said random sequence of digits into the personal electronic device, said control circuit receiving said unlock input when said first transceiver receives said random sequence of digits from the personal electronic device;

a second transceiver being positioned in said housing, said second transceiver being electrically coupled to said control circuit, said second transceiver being in wireless communication with a global positioning system thereby facilitating said second transceiver to communicate the physical location of said box to said first transceiver, said first transceiver broadcasting the physical location of said box to the personal electronic device wherein said first transceiver is configured to facilitate the recipient of the food delivery to track the food delivery;

a display being integrated into said front wall of said housing, said display being electrically coupled to said control circuit, said display displaying indicia comprising words and numbers for visually communicating said random sequence of digits;

a plurality of control buttons, each of said control buttons being movably integrated into said front wall of said housing, each of said control buttons being electrically coupled to said control circuit, each of said control buttons controlling various operational parameters of said control circuit;

a power supply being positioned in said housing, said power supply being electrically coupled to said control circuit, said power supply comprising at least one battery, and said locking unit broadcasting the pin to the personal electronic device when a phone number of the recipient is entered with the plurality of control buttons.

* * * * *